M. J. BACON.
AIR PRESSURE PLUG.
APPLICATION FILED MAY 8, 1918.
1,292,988.
Patented Feb. 4, 1919.
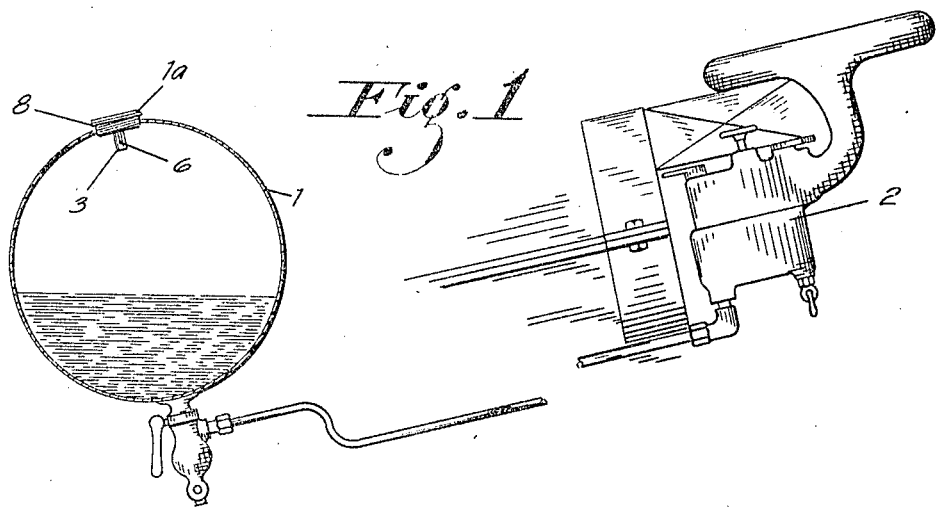
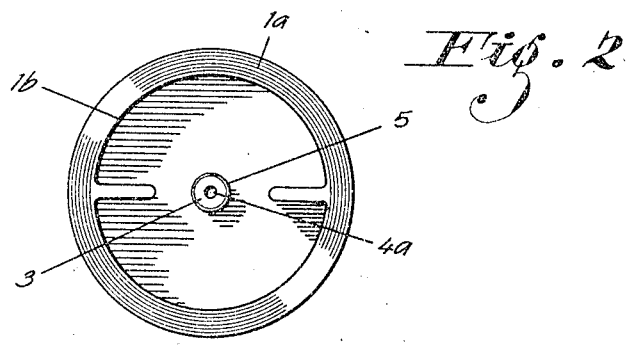
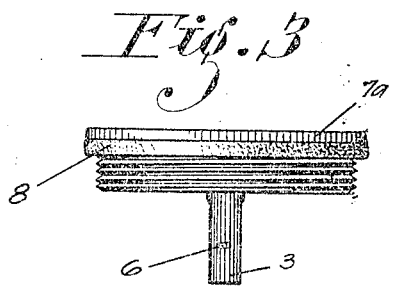
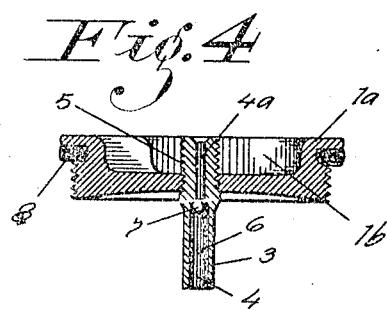
INVENTOR.
Mark J. Bacon
BY
Berry S. Webster
ATTORNEY.

UNITED STATES PATENT OFFICE.

MARK J. BACON, OF MAY, CALIFORNIA.

AIR-PRESSURE PLUG.

1,292,988.　　　　Specification of Letters Patent.　　Patented Feb. 4, 1919.

Application filed May 8, 1918. Serial No. 233,221.

*To all whom it may concern:*

Be it known that I, MARK J. BACON, a citizen of the United States of America, residing at May, in the county of Amador and State of California, have invented certain new and useful Improvements in Air-Pressure Plugs; and I do declare the following to be a clear, full, and exact description of the same, reference being had to the accompanying drawings, and to the characters of reference thereon, which form a part of this application.

This invention relates to improvements in automobile accessories, particularly for that type of machine which employs an air fuel tank which feeds to the carbureter of the engine by gravity. In this type, when the vehicle mounts inclines, such as hilly roads or banks of streams or ditches, the carbureter inlet often rises above the level of the fuel in the tank with the result that the engine stalls and the vehicle must either be backed to a point where the two levels will be the same, or else abandoned.

The invention applies to any or all types of automobiles or tractors having a fuel supply means of the type noted.

By my improved invention, I aim to provide a means which can be readily attached to the supply opening cap of any tank whereby a tire pump or other pump of any kind may be used to temporarily place the tank under air pressure, whereby the fuel will be force fed to the carbureter, thus overcoming the difficulties noted.

A further object of the invention is to produce a simple and inexpensive device and yet one which will be exceedingly effective for the purposes for which it is designed.

These objects, I accomplish by means of such structure and relative arrangement of the parts as will fully appear by a perusal of the following specification and claim.

On the drawings, similar characters of reference indicate corresponding parts in the several views.

Figure 1 is a cross sectional view of a fuel supply tank and outlet showing its connection with the carbureter, and showing how, when the carbureter inclines to a certain point relative to the tank, the fuel will not feed to the same by gravity. My improved air pressure plug is shown in position on the tank cap.

Fig. 2 is a top plan view of the inlet opening cap of the tank showing my improved plug connected therewith.

Fig. 3 is a side elevation of the plug.

Fig. 4 is a vertical cross section through the structure shown in Fig. 3.

Referring now more particularly to the characters of reference on the drawings, the numeral 1 designates the fuel tank arranged to feed the carbureter 2 under all ordinary circumstances by gravity only. Screwed into said tank 1 is the usual cover cap 1ª for the inlet opening into said tank.

My improved invention comprises a plug 3 having a central orifice 4 from end to end, the orifice 4 reducing in diameter at its upper end as at 4ª. The outside of the upper end of the plug 4 is threaded, as at 5, whereby when corresponding threads are made in the cap 1ª, the plug may be screwed into any ordinary cap now in use. These threads 5 are also made of a standard gage or pitch found in the connecting fittings of tire pumps. A pin 6 is disposed across the opening 4 and a ball 7 is disposed between the pin 6 and the reduced opening 4ª, whereby, when pressure is exerted outwardly through the opening 4, it will force the ball against the opening 4ª and close the same. The cap 1ª, of course, is dished out, as at 1ᵇ, so that the projecting portion of the plug 3 will not be struck and broken by the seat or other object which may be placed on top of the cap 1ª.

In practice, when the inlet of the carbureter 2 inclines above the fuel level in the tank 1, and therefore the fuel is not admitted to the engine, a pump may be threaded onto the threads 5 and the tank 1 placed under pressure. When the pump is removed, the pressure forces the ball against the outlet 4ª and maintains the pressure on the tank as long as the same is required. When the fuel is feeding by gravity, the ball 7 falls away from the opening 4ª and rests on the pin 6, leaving the opening 4ª freely open so that there will be no tendency to vacuum within the tank 1, which would prevent the fuel feeding freely to the carbureter. A gasket 8 is suitably mounted around the cap 1 to make an air tight joint between it and the tank as is necessary to the successful operation of the device.

From the foregoing description, it will readily be seen that I have produced such a device as substantially fulfils the object of the invention as set forth herein.

While this specification sets forth in detail the present and preferred construction of the device, still in practice, such deviations from such detail may be resorted to as do not form a departure from the spirit of the invention, as defined by the appended claim.

Having thus described my invention, what I claim as new and useful and desire to secure by Letters Patent is:—

The combination with an airtight fuel tank cover, of an air pressure valve permanently screwed into the cover and projecting therethrough, such valve having a longitudinal orifice therein, the upper portion of the orifice being smaller in diameter than the lower portion, a ball whose diameter is slightly smaller than the lower portion of said orifice slidable therein and adapted to seat in the smaller orifice at the junction thereof with the larger orifice when air is forced into the tank therethrough, and a transverse pin projecting through the lower orifice below the ball, whereby the ball will rest thereon when the air pressure in the tank is exhausted and permit the free access of air at normal atmospheric pressure to the tank.

In testimony whereof I affix my signature.

MARK J. BACON.